Figure 1:
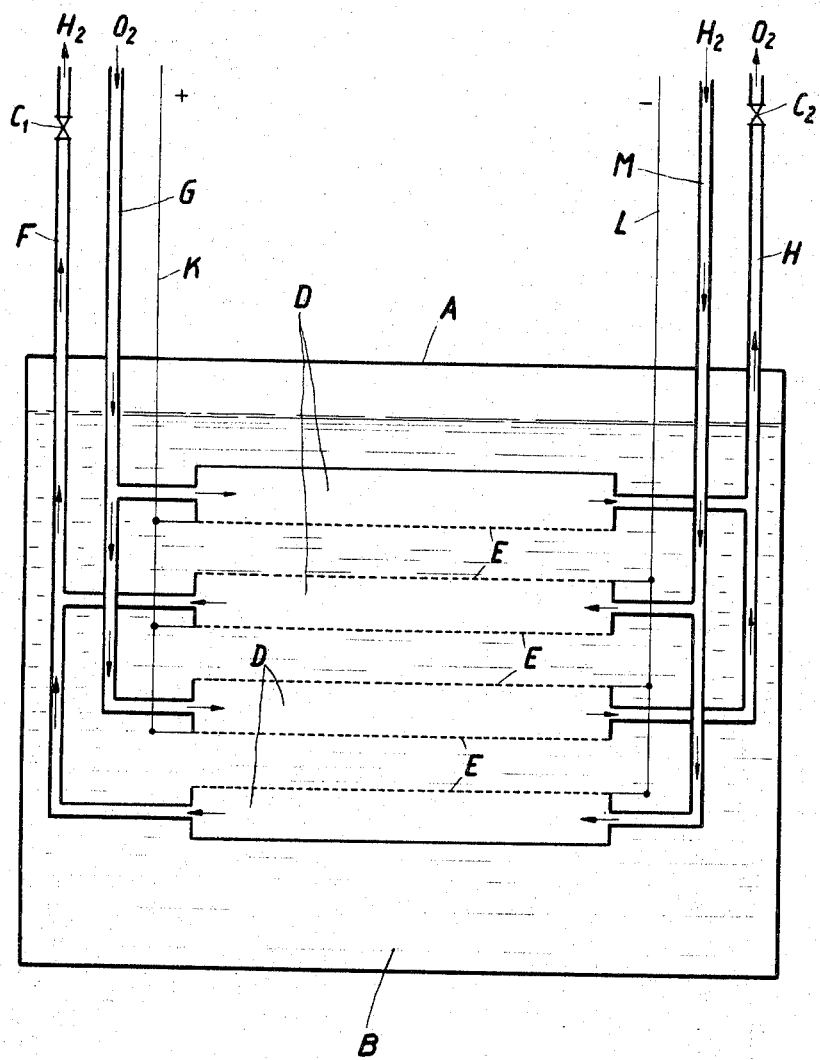

United States Patent Office 3,351,492
Patented Nov. 7, 1967

3,351,492
FUEL CELL WITH ELECTRODE HAVING FINE PORE OPENINGS
Josef Heyes, 20 Markgrafenstr., Dusseldorf, Germany, and Wilhelm Anton Fischer, 67 Mulheimer Strasse, Ratingen, near Dusseldorf, Germany
Filed Aug. 29, 1963, Ser. No. 305,424
7 Claims. (Cl. 136—86)

This invention relates to electrodes for fuel cells. Fuel cells are understood to be electric cells in which the chemical energy of oxidation of a fuel such as hydrogen, carbon monoxide and the like, can be directly converted into electrical energy.

The electrodes used in such fuel cells are gas diffusion electrodes. In other words, they are porous elements made of powdered metal or carbon. Each fuel cell contains at least two such electrodes in a common electrolyte. The fuel gas enters one of the two electrodes and the oxidiser, generally oxygen or an oxygen-containing gas, such as air, or a halogen, such as chlorine, enters the other. The reaction between the gas and the electrolyte proceeds in the pores of the electrode.

A well known difficulty which arises in the operation of such a fuel cell is that inert gases may accumulate inside the electrodes. The presence of these gases has a polarising effect by impeding or interrupting the further supply of the reaction gas. Since the prior complete removal of inert gas from the reaction gas is an economically prohibitive proposition, it has been proposed periodically to blow the accumulated inert gases out of the electrodes into the electrolyte by intermittently raising the gas pressure to a level at which the reaction gas is forced completely through the pores of the electrode. However, if this scheme is adopted a uniformly continuous operation of the fuel cell naturally becomes impossible.

It has also been recognised that non-uniformity of the cross sections of the electrode pores is a drawback, and attempts have therefore been made to take suitable steps for overcoming this difficulty. For instance, it has been proposed to treat the powder metal electrodes in a galvanic bath with a view to constricting the larger pores or to provide the mould used for producing the electrodes with filamentous filler materials having substantially parallel threads, such as textile fibres (velvet) or fine metal wires, then to introduce powdered graphite, carbon or metal into the interstices before compacting or sintering the electrode and finally to remove the filler material. The object of thus regularising the pores in the pressed or sintered electrodes (which in practice is extremely difficult to accomplish) is to prevent more than a few pores from becoming blocked by excessive penetration of the electrolyte and the gas from escaping unoxidised through other pores into the electrolyte.

It has further been proposed to use electrodes consisting of wire mesh. The energy conversion is thought to depend upon the size of the wire mesh surface which by surface-active forces is wetted by the electrolyte in the gas region. Energy conversion should thus be the better the larger the surface of the wire mesh. However, these ideas, though dating as far back as 1938, have not proved successful either in research or in practice.

In hydrogen-air fuel cells in which two iron electrodes arm immersed in molten sodium hydroxide, one electrode being supplied with air and the other with hydrogen, a known arrangement consists in giving the electrode the shape of a bell, the open bottom of the bell, which is submerged in the electrolyte, being closed by a screen. This screen may be a brush, a cage, wire mesh or a cushion of wire chips. The air and the hydrogen respectively are intended to enter the electrolyte through this screen. This type of electrode is not therefore one in which the active boundaries are intended to be within the electrode interior and in which the entry of gas into the electrolyte is intended to be substantially suppressed.

It is the object of the present invention to provide a greatly improved type of electrode for a fuel cell which operates by the passage of the gases over one electrode surface, the other being in contact with a liquid electrolyte, and in which said electrodes consist of a gas-permeable metal with regular open pores, the phase boundary between the gas, the electrode and the electrolyte being maintained on the electrolyte side of the electrode.

Figure 2:
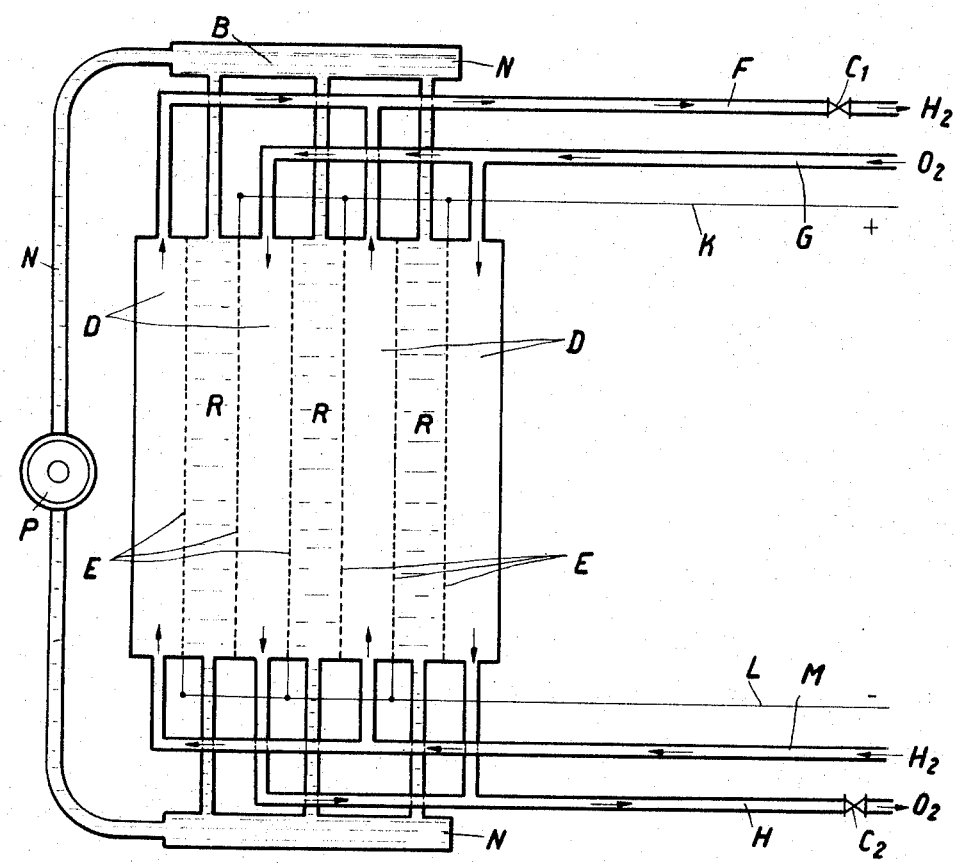

In the drawing, FIG. 1 is a schematic view of a fuel cell containing a common electrolyte bath in which perforated screen electrodes in accordance with one embodiment of the invention are immersed, while FIG. 2 is a schematic view similar to that of FIG. 1 in which a circulating electrolyte arrangement is used.

Contrary to the known type of sintered, porous electrode one embodiment of the proposed electrode consists of a gas-permeable metal containing passages of uniform size. For the production of such electrodes it is proposed to use, for example, capillary tubes of small internal diameter between say 0.01 and 1 mm., as are readily available on the market for radio engineering purposes. Conveniently these capillary tubes are packed into bundles and joined together by soldering or other suitable methods of bonding so that no gas can pass otherwise than through the capillaries. Contact between the gases and the electrolyte must then take place exclusively in the interior of the capillaries. Since the capillaries all have equal diameters, so that capillary pressure is everywhere the same, the phase boundary between electrolyte and gas can be successfully maintained at a point near the end of the capillary on the electrolyte side simply by appropriately adjusting the gas pressure. This arrangement facilitates diffusion of the reaction products into the electrolyte with a resultant very favourable effect upon the current density in the electrode.

An alternative method of producing useful electrodes is to form a bunch of suitably thin wires of round or other cross section and to enclose the same in an envelope so that the interstices between the wires form the capillaries, i.e. having internal diameters between 0.01 and 1 mm. each.

Furthermore, according to the invention, the capillary bundles produced as described can be cut into short lengths and the said lengths joined together by soldering or other methods of metal bonding to form a capillary plate.

Another proposal of the present invention consists in limiting the thickness of such an electrode and hence the length of the passages to a maximum of 2 mm. It is preferred that the thickness of the electrodes should in fact be far less than 2 mm., say only 0.05 mm. Thin electrodes of the contemplated kind may also be constituted by metal screens with fine perforations, e.g. in which the perforations have cross-sections between $10^{-6}$ and $10^{-2}$ sq. mm. each. If desired, the electrode surfaces may be provided with supplementary current conductors, for instance in rib or mesh form. The electrodes may be embedded in a chamber consisting of electrically conducting or non-conducting material.

Suitable perforated screen can be produced, for instance, by conventional electroplating techniques so that the holes have diameters of $15\mu$, i.e. 0.015 mm., and even less.

Since such electrodes can be made very thin the reaction between the gases in the fuel cell can proceed at the boundary face between metal and liquid, unimpeded by diffusion effects which increase the resistance.

It is well understood that when one end of a capillary tube is immersed in a liquid and the other communicates with a chamber filled with a gas at a pressure P, no gas will enter the liquid until the pressure of the gas is high enough to exceed the sum of the liquid pressure and of the capillary pressure defined by the formula $P=2/r$, wherein P is the capillary pressure, the surface tension of the electrolyte, and $r$ is the radius of the cross section of the capillary tube. (This formula naturally applies to circular sections, and must be appropriately modified for sections of other kinds.)

The above formula is true for any capillary, including capillaries which in order of magnitude are roughly of the same length as their diameter.

Therefore, if the pressure maintained in a chamber divided off by a screen is greater than or equal to the pressure of the liquid, it may vary within the limits imposed by the capillary pressure without any gas escaping from the chamber or liquid entering the same.

The arrangement permits an electric current to be generated continuously. Whereas it was hitherto necessary, by raising the gas pressure from time to time, to blow out accumulations of inert gases such as nitrogen, argon, carbon dioxide and so forth, contained in the gases supplied to the fuel cell, this is unnecessary in an arrangement according to the invention because the major proportion of the fuel gas can be reacted with the simultaneous generation of electrical energy simply by passing the reaction gases over the electrode surface. The smaller remaining portion, now enriched with the inert components, will leave the gas chamber. This portion can then be used for evaporating the water formed by the hydrogen-oxygen reaction, preventing its accumulation in the electrolyte, or for removing other reaction products from the electrolyte, such as carbon dioxide and hydrogen chloride. Instead of using pure oxygen, as was hitherto preferentially done to prevent the capillaries from being choked, air can now be employed. Alternatively, the electrodes may be disposed in a common electrolyte the one above the other.

Embodiments of the invention are shown in the accompanying drawings. It will be understood that these illustrative examples are not intended to limit the scope of the invention in any way.

FIG. 1 exemplifies an arrangement for the generation of electrical energy based on the use of perforated screen plates.

A vessel A contains the electrolyte B which in the illustrated embodiment is presumed to consist of concentrated NaOH. Alternative electrolytes could, of course, likewise be used. The supply pipes for oxygen and hydrogen G, M lead to the gas chambers D which are closed by say nickel screen plates E with ultrafine perforations. Electrode plates formed by compounding bundled capillary tubes could be similarly used.

The two gases oxygen and hydrogen form ions at the screen plate and these will react to form water.

The inert gases contained in the gases are removed through pipes F and H together with the unreacted part of the hydrogen and/or oxygen, the rate of withdrawal being controlled by valve means $C_1$ and $C_2$.

The current generated in the perforated screen plates is conducted away through wires K and L. The screen plates which enclose like volumes of gas in the gas chambers may be electrically connected either in parallel or in series. For improving its homogeneity the electrolyte may be stirred.

FIG. 2 shows another arrangement which differs from that in FIG. 1 only in that vessel A is omitted and the electrolyte can be circulated by pump means P through a pipe system N and the liquid containing chambers R.

We claim:

1. In a fuel cell for use with a liquid electrolyte and having an electrolyte space in which are disposed a pair of operatively opposed electrodes for electrochemical conversion thereat of corresponding fuel and oxidant reactants in contact with the liquid electrolyte with the concomitant generation of electrical energy and further having corresponding conducting means connected to such electrodes for utilizing the electrical energy generated, the improvement which comprises providing at least one of such electrodes as a gas diffusion electrode, in communication on one side with the electrolyte space and on the other side with a gas space for a corresponding gaseous reactant to be electrochemically converted at said electrode and forming an interface between said spaces, such that the electrochemical conversion takes place at a phase boundary between the gaseous reactant, gas diffusion electrode and electrolyte on the electrolyte side of said electrode, said gas diffusion electrode constituting a porous metal plate having a thickness less than 2 mm. and uniform fine open pores therethrough which is defined by a bundle of capillary tubes of uniform length corresponding to the thickness of said plate and of uniform internal diameter between 0.01 and 1 mm. corresponding to the fineness of said pores which are bonded together at their peripheries to block the interstices therebetween, whereby flow communication through said plate will take place only at said tubes.

2. Improvement according to claim 1 wherein both the electrodes of such pair are such capillary tube gas diffusion electrodes.

3. In a fuel cell for use with a liquid electrolyte and having an electrolyte space in which are disposed a pair of operatively opposed electrodes for electrochemical conversion thereat of corresponding fuel and oxidant reactants in contact with the liquid electrolyte with the concomitant generation of electrical energy and further having corresponding conducting means connected to such electrodes for utilizing the electrical energy generated, the improvement which comprises providing at least one of such electrodes as a gas diffusion electrode, in communication on one side with the electrolyte space and on the other side with a gas space for a corresponding gaseous reactant to be electrochemically converted at said electrode and forming an interface between said spaces, such that the electrochemical conversion takes place at a phase boundary between the gaseous reactant, gas diffusion electrode and electrolyte on the electrolyte side of said electrode, said gas diffusion electrode constituting a porous metal plate having a thickness less than 2 mm. and uniform fine open pores therethrough which is defined by a bundle of thin wires of uniform length corresponding to the thickness of said plate so closely packed that the interstices therebetween form capillary tubes of uniform diameter between 0.01 and 1 mm. corresponding to the fineness of said pores, whereby flow communication through said plate will take place only at said interstices.

4. Improvement according to claim 3 wherein both the electrodes of such pair are such thin wire gas diffusion electrodes.

5. In a fuel cell for use with a liquid electrolyte and having an electrolyte space in which are disposed a pair of operatively opposed electrodes for electrochemical conversion thereat of corresponding fuel and oxidant reactants in contact with the liquid electrolyte with the concomitant generation of electrical energy and further having corresponding conducting means connected to such electrodes for utilizing the electrical energy generated, the improvement which comprises providing at least one of such electrodes as a hollow gas diffusion electrode, in communication on one side with the electrolyte space and on the other side with a gas space for a corresponding gaseous reactant to be electrochemically converted at said electrode and forming an interface between said spaces, such that the electrochemical conversion takes place at a phase boundary between the gaseous reactant, gas diffusion electrode and electrolyte on the electrolyte side of said electrode, and means for introducing one of said reactants into said hollow electrode, said hollow gas diffusion electrode including a porous metal plate having a thickness less than 2 mm. and uniform fine open pores therethrough which is defined by a fine screen having perforations therethrough of uniform length corresponding to the thickness of said plate and of uniform internal diameter of at most 0.015 mm. corresponding to the fineness of said pores, whereby flow communication through said plate will take place only at said perforations.

6. Improvement according to claim 5 wherein both the electrodes of such pair are such fine screen gas diffusion electrodes.

7. Improvement according to claim 5 wherein said screen has a thickness of about 0.05 mm. and said perforations have a length corresponding to said thickness and uniform internal diameter flow cross-sections between $10^{-6}$ and $10^{-2}$ sq. mm.

References Cited

UNITED STATES PATENTS

| | | | |
|---|---|---|---|
| 487,644 | 12/1892 | Rogers | 136—86 |
| 2,384,463 | 9/1945 | Gunn et al. | 136—86 |
| 2,901,523 | 8/1959 | Justi et al. | 136—86 |
| 3,062,962 | 11/1962 | McGee | 313—348 X |
| 3,080,442 | 3/1963 | Hobert | 136—86 |
| 3,121,031 | 2/1964 | Gruneberg et al. | 136—86 |
| 3,223,878 | 12/1965 | Todd | 313—348 |
| 3,228,797 | 1/1966 | Brown et al. | 136—86 |

ALLEN B. CURTIS, *Primary Examiner.*

WINSTON A. DOUGLAS, *Examiner.*